United States Patent
Hsiao et al.

(10) Patent No.: US 6,687,609 B2
(45) Date of Patent: Feb. 3, 2004

(54) MOBILE-TRAILER TRACKING SYSTEM AND METHOD

(75) Inventors: Victor K. Hsiao, Mission Viejo, CA (US); William Peter Williams, Redondo Beach, CA (US)

(73) Assignee: Navcom Technology, Inc., Torrance, CA (US)

( * ) Notice: Subject to any disclaimer, the term of this patent is extended or adjusted under 35 U.S.C. 154(b) by 33 days.

(21) Appl. No.: 10/171,586

(22) Filed: Jun. 13, 2002

(65) Prior Publication Data

US 2003/0233189 A1 Dec. 18, 2003

(51) Int. Cl.$^7$ .............................................. G06F 17/60
(52) U.S. Cl. ........................ 701/207; 340/993; 342/27
(58) Field of Search ............................ 701/207, 200; 73/178 R; 340/988, 993; 342/27

(56) References Cited

U.S. PATENT DOCUMENTS 5,880,958 A * 3/1999 Helms et al. ............... 701/117
6,492,904 B2 * 12/2002 Richards .................. 340/539.1

* cited by examiner

Primary Examiner—William A. Cuchlinski, Jr.
Assistant Examiner—Olga Hernandez
(74) Attorney, Agent, or Firm—Gary S. Williams; Pennie & Edmonds LLP (57) ABSTRACT

A position tracking system for a plurality of mobile tractors and trailers includes an unique electronic identifier for each of a plurality of trailers. For each tractor of a plurality of tractors, the position tracking system includes a navigation system for determining a current position of the tractor, an electronic identifier reader for acquiring the electronic identifier of a trailer coupled to the tractor, and a position-reporting subsystem for reporting to a remote system the current position of the tractor and the electronic identifier of the trailer coupled to the tractor. In addition, the position tracking system includes, at each facility of a plurality of fixed-location facilities, one or more electronic identifier readers for acquiring the electronic identifier of one or more trailers located within the facility, and a trailer-presence reporting subsystem for reporting to the remote system the presence of the one or more trailers located within the facility.

31 Claims, 6 Drawing Sheets

MOBILE-TRAILER TRACKING SYSTEM AND METHOD

The present invention relates generally to vehicle tracking systems, and in particular, to a tracking system for mobile trailers that maintains location and tractor coupling information for a fleet of mobile trailers.

BACKGROUND OF THE INVENTION

Transportation of cargo via tractor-trailers is an important part of worldwide commerce. (In this context, a "tractor" is a reference to a highway truck, such as a semi-truck). The complex and large-scale operations of tractor-trailer fleet owners dictate that the owners keep track of the status and general location of their vehicles as accurately as possible. This facilitates, among other things, efficient allocation of pick-up and delivery of goods, increased equipment utilization, effective maintenance scheduling, improved cargo security, decreased asset losses, and rapid assistance for vehicles in need of repair or help. The advent of the Global Positioning System ("GPS") has greatly assisted these efforts, as geographic location can now be pinpointed within a number of meters, allowing position information for vehicles to be accurately determined. Coupled with a method of reporting a current location for a vehicle, a GPS-based tracking system can provide the kind of centralized tracking and management that fleet owners need, particularly when thousands of vehicles must be tracked.

Numerous systems exist to provide continuous tracking of highway tractors. These tractor-tracking systems include, for example, the "OmniTRACS" system from Qualcomm, the Orbcomm data messaging system from Orbcomm company, and the Motient/Norcomm vehicle tracking system. They typically include a GPS system and a satellite-based data messaging system (and, optionally, other sensors and control relays). Messages, including the location of the tractor, are communicated between the tractor and a central office through the satellite-based system. Other systems use cellular-based systems for communications and data messaging. These systems are generally only effective in urban areas or along highways having cellular telephone coverage.

Generally, tractor-tracking systems are not useful or effective for directly tracking mobile trailers. This is because tractor-tracking systems lack any automatic mechanism to identify or monitor trailers, instead requiring an operator to manually input trailer data. As a result, the visibility of a trailer's location is lost once the trailer is disconnected from the reporting tractor. Additionally, it is not practical to simply install the tractor-tracking systems directly on the mobile trailers. This is because trailers generally only have power when connected to a tractor, and therefore do not have the necessary power source to operate a tractor-tracking system (used here for trailer-tracking) independent of the tractor. It takes a considerable amount of power to communicate with satellites orbiting 22,500 miles above the earth, like the satellites used for Qualcomm's OmniTracs system.

Some companies do offer untethered trailer-tracking systems, however. (An "untethered" trailer is a trailer that is not hooked, or does not need to be hooked, to a tractor's power supply.) For example, Orbcomm's LEO trailer-tracking system relies upon Low Earth-Orbit satellites for communications. Because LEO satellites are closer to the ground (e.g., 500 miles), less complex and less powerful antennas and communicators can be used to talk to these satellites than with traditional geostationary satellites. Similarly, cellular-based modem systems require less power than traditional satellite-based systems and can be used for untethered trailers, although they lack the coverage of the full-scale tractor-tracking systems. For example, Qualcomm's TrailerTracs product relies upon a cellular-based system for untethered trailer communication.

Both of these types of untethered trailer-tracking systems rely upon battery power for untethered trailer communications. Their power requirements are substantial. For example, communicating with the Orbcomm LEO satellites consumes power at a rate of almost 6 watts, while a cellular-based modem uses power at a rate of almost 600 mW. At these power levels, batteries can be drained very quickly, limiting the usefulness of such systems. Also, the large power demands placed on the batteries requires that the batteries be serviced often and replaced frequently, and makes the batteries particularly susceptible to failure. These types of systems generally do not communicate with the tractor itself, and therefore cannot provide specific tractor identification and coupling information, other than a basic "tractor hooked" determination.

Thus, it would be desirable to provide a trailer-tracking system that can provide automatic tracking of mobile trailers, but without the substantial power requirements of a tractor-based communications system.

Another important issue to tractor-trailer fleet owners is the ability to monitor trailer-yard inventory. When trailers are not in use, they are commonly stored in "trailer yards," large open facilities with rows of trailers. Large distribution centers may also maintain trailer yards for temporary storage while trailers are being loaded or unloaded. Some trailer yards may contain hundreds, or even thousands, of trailers. An efficient means to keep track of trailers in a yard is very important, for the same reasons that monitoring tractor-trailer fleets is important. Some fleet operators may rely upon the battery-operated untethered trailer-tracking systems to provide GPS position data indicating that a particular trailer is presumed to be in a yard, based on the yard's known coordinates. Alternatively, some systems provide radio frequency tagging of trailers, known as RFID, or radio frequency ID.

A basic RFID system has three components: (1) an antenna or coil; (2) a transceiver with a decoder; and (3) an RFID tag, also called a transponder, which is electronically programmed with specific information. Transceivers with strategically placed antennas emit radio signals to activate RFID tags. The transceivers can read data from the tag, write data to the tag, or both. Antennas are the link between tags and transceivers, converting between radio waves and electrical signals. Often, antennas are packaged with the transceiver and decoder to become an interrogator, also known as a reader.

RFID tags typically contain an antenna or inductive coil, memory, and a small processor. They can be identified as active or passive, depending on the means by which they obtain their power. Passive tags operate without an internal battery source, deriving their power from the energy transmitted by the reader. A passive tag is energized by radio waves from the reader, and instantaneously transmits a unique pre-coded identifier back to the reader. Active tags utilize a power source such as an internal battery, and therefore reduce the power requirements of the reader. Active tags can provide greater communication range and better noise immunity than passive transponders. Active tags can also result in higher data transmission rates when used at higher radio frequencies.

Interrogators emit radio waves with an effective range of anywhere from one inch to 200 feet or more, depending on the unit's power output and the radio frequency used. When an RFID tag passes through the interrogation zone, it detects the RF activation signal, causing the tag to transmit its data. The interrogator receives and then decodes the data. Finally, data is passed to the host computer for processing. In the trailer-yard context, RFID tags have been placed on trailers and used to monitor the inventory of trailers in a yard. However, once trailers equipped with RFID tags are outside of the transmit and receive range of the transceiver, visibility for the trailer is lost. Thus it would be desirable to provide a trailer-tracking system that integrates trailer-yard inventorying systems with trailer-position tracking systems.

Thus, a need exists for a system that can track a fleet of mobile trailers, whether tethered or untethered, and whether in transport on a highway or located in a trailer yard.

SUMMARY OF THE INVENTION

In one embodiment of the present invention, a position tracking system for a plurality of mobile tractors and trailers includes an unique electronic identifier for each of a plurality of trailers. Also, for each tractor the position tracking system includes a navigation system for determining a current position of the tractor, and an electronic identifier reader for acquiring the electronic identifier of a trailer coupled to the tractor. The position tracking system further includes, for each tractor, a position reporting subsystem that is coupled to the navigation system and to the electronic identifier reader. The position reporting reports to a remote system the current position of the tractor and the electronic identifier of the trailer coupled to the tractor.

In addition, the position tracking system includes, at each facility of a plurality of fixed-location facilities, one or more electronic identifier readers for acquiring the electronic identifier of one or more trailers located within the facility. Each facility also includes a trailer-presence reporting subsystem, coupled to the one or more electronic identifier readers of the facility, for reporting to the remote system the presence of the one or more trailers located within the facility.

Another embodiment of the present invention is a remote system for use with a plurality of mobile tractors, mobile trailers, and fixed-location yards. Each trailer has an unique identifier, which can be read by a tractor to which the trailer is coupled, and that can also be read by a fixed-location yard in which the trailer is located. Further, each tractor has a navigation system for determining a current position of the tractor. The remote system includes a communication module for receiving tractor information, including information identifying a current position of a tractor and an electronic identifier of a trailer coupled to the identified tractor. The tractor information is received from a communication device on the tractor. Additionally, the communication module receives yard information, including an electronic identifier of a trailer located within a fixed-location yard, which is received from a communication device at the fixed-location yard. Further, the remote system includes a database for storing information concerning a location of a subset of each of the plurality of mobile tractors and trailers.

Yet another embodiment of the present invention is a method of maintaining a mobile tractor-tailer database for use in a position tracking system for a plurality of mobile tractors, mobile trailers, and fixed-location yards. Each trailer of the plurality of mobile trailers has an unique identifier that can be read by a tractor to which the trailer is coupled, and that can also be read by a fixed-location yard in which the trailer is located. Further, each tractor has a navigation system for determining a current position of the tractor. The method includes receiving, at a remote system, a report from a communication device on a tractor indicating a current position of the tractor, and indicating an electronic identifier of a first trailer coupled to the tractor. The method further includes receiving, at the remote system, a report from a communication device at a fixed-location facility indicating the electronic identifier of a second trailer present in the facility.

In addition, the method includes storing in the mobile tractor-trailer database at least one entry selected from the group consisting of: (1) a representation of the electronic identifier of the first trailer; (2) an indication that the first trailer is coupled to the tractor; (3) a position, affiliated with the first trailer, representing a current position of the tractor; (4) a representation of the electronic identifier of the second trailer; and (5) an indication that the second trailer is present in the facility.

DESCRIPTION OF THE PREFERRED EMBODIMENTS

Generally, in one embodiment, the invention is a trailer-tracking system for a fleet of mobile trailers. Each of the trailers contains an RFID tag providing an unique electronic identifier of the trailer. The trailers are transported by a fleet of mobile tractors (e.g., semi-trucks), each of which has an RFID tag reader. When a trailer is attached to a tractor, and hence the trailer's RFID tag is within a short distance of the tractor's RFID tag reader, the tractor can determine the unique electronic identifier of the trailer. Each tractor additionally contains a navigation system, typically a GPS system, for determining the location of the tractor. Using a communications link, each tractor (identified by an unique tractor identifier) can report the electronic identifier of the trailer it is coupled to (if any), together with its position, back to a centralized office, also referred to herein as a remote system. The communications link is wireless, and can communicate through cellular-based or satellite-based technology.

The fleet of mobile trailers are stored at trailer yards (also referred to herein as fixed-location facilities and fixed-location yards), whether temporarily or for extended periods. At each trailer yard, another RFID tag reader at a yard station detects the unique electronic identifier of each trailer that is "registering" (i.e., arriving) in the yard. A trailer yard has, in one embodiment, two RFID tag readers at the gate—an arrival tag reader and a departure tag reader. The arrival tag monitors incoming tractor-trailers, and the departure tag monitors departing tractor-trailers. In small yards, the RFID tag reader may cover the entire yard, but with large yards, the electronic identifiers will only be detectable at the gate. Thus, the system knows that a trailer is registering at a yard by: (1) the trailer being reported as coupled to a tractor; and (2) the trailer being detected by the arrival RFID tag reader. Conversely, the system knows that a trailer is deregistering from the yard by: (1) the trailer being reported as recently coupled to a tractor; and (2) the trailer being detected at the departure RFID tag reader. A database at the remote system stores, under the electronic identifier of each trailer, the location of the trailer, any tractor to which the trailer is coupled, and whether the trailer is registered or deregistered from any yards, for example.

Figure 1:
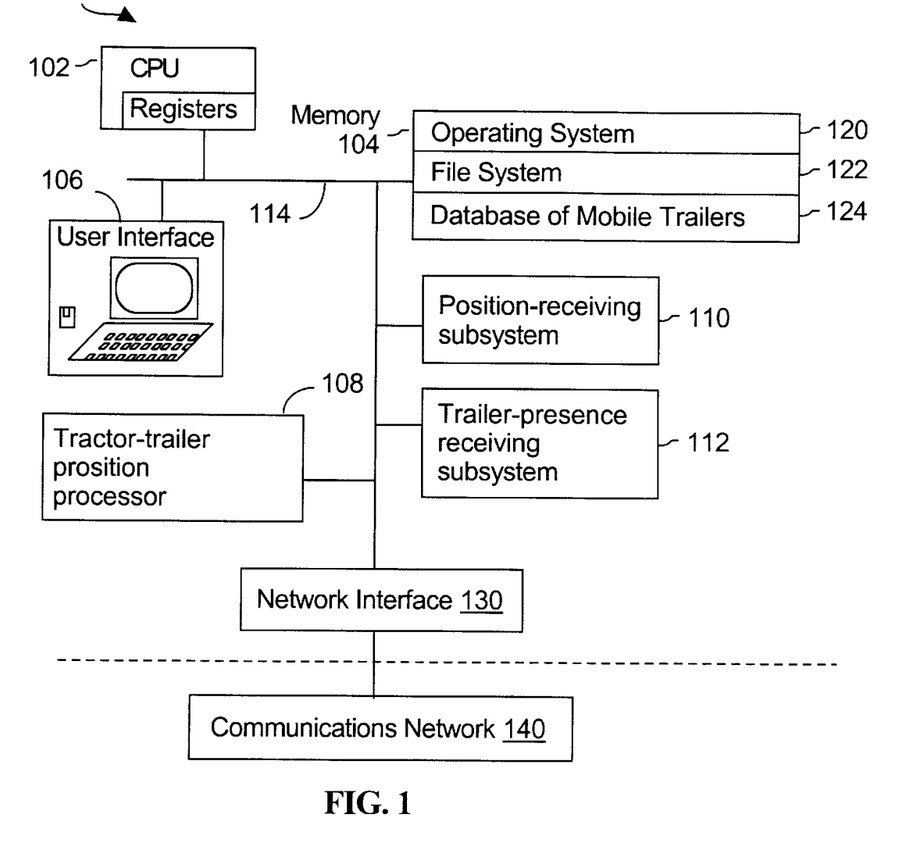
FIG. 1 is a block diagram of a general purpose computer that can practice one embodiment of the present invention.

Referring to FIG. 1, a computer system 100 (sometimes herein called "the remote system") that is capable of practicing many of the functions of the present invention is shown. The computer system is typically be located at a centralized office, which is remotely located from most of the tractors and trailers whose location and status is tracked by the computer system 100. Computer system 100 contains one or more central processing units (CPU) 102, memory 104 (including high speed random access memory, and non-volatile memory such as disk storage), an optional user interface 106, a tractor-trailer position processor 108, a position-receiving subsystem 110, and a trailer-presence receiving subsystem 112, all of which are interconnected by one or more system busses 114. The computer system 100 is also connected to a remote communications network 140 through a network interface 130. The communications network 140 may comprise a Local Area Network if the computer system is located locally at, for example, a trailer yard, or may comprise a Wide Area Network or the Internet if the computer system 100 is located centrally.

The memory 104 typically stores an operating system 120, file system 122, and a database of mobile trailers 124. The database of mobile trailers 124 can also be organized as a tractor-tailer database, as both types of databases contain tractor and trailer information, but are organized differently. The two terms will be used synonymously to refer to a database that contains the types of information described herein, as it relates to mobile tractors and to mobile trailers. The tractor-trailer position processor 108, the position-receiving subsystem 110, and the trailer-presence receiving subsystem 112, while shown as separate components in FIG. 1, may in fact be combined into a single component. Alternatively, they can be implemented as modules (i.e., executable software) in memory 104. Also, while a single remote system 100 is shown, in practice, the mobile trailer-tracking system of the present invention may utilize more than one remote system, or may use a geographically-diverse, distributed remote system.

Figure 2:
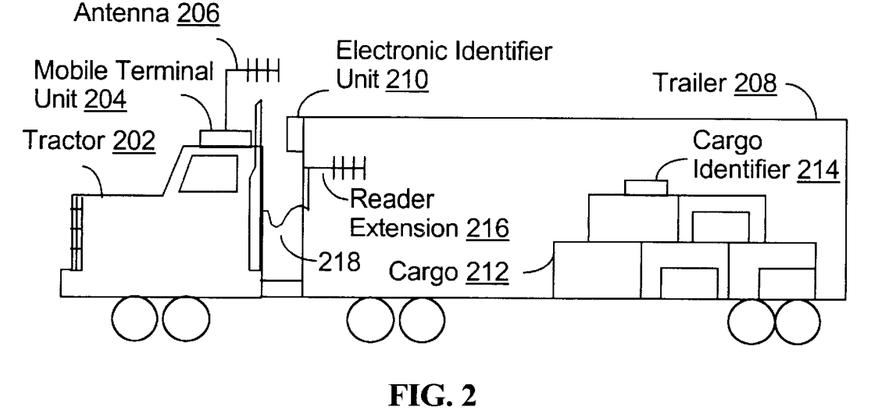
FIG. 2 is a schematic of a tractor-trailer configured with a mobile terminal unit and antenna on a tractor, and an electronic identifier unit, cargo identifier, and reader extension on a trailer, in accordance with one embodiment of the present invention.

Referring to FIG. 2, an example of a tractor-trailer that practices an embodiment of the present invention is shown. Tractor 202 includes a mobile terminal unit 204, which is attached to antenna 206. Coupled trailer 208 includes an electronic identifier unit 210, which is read by the mobile terminal unit 204, as will be described in further detail below. Trailer 208 also contains, in this example, a trailer-load of cargo 212, which includes an electronic cargo identifier 214.

As with the electronic identifier unit 210, the electronic cargo identifier 214 is read by the mobile terminal unit 204. However, instead of being read through antenna 206, the electronic cargo identifier 214 is read by the reader extension 216 of the mobile terminal unit, which is an antenna mounted on the inside of the coupled trailer 208. The reader extension antenna 216 is connected back to the mobile terminal unit through wired tractor-trailer connection 218. A wired connection is generally made between a tractor and a coupled trailer to link, for example, the trailer's brake and signal lights to the tractor's lights. Thus, this connection provides a convenient way to effectively extend antenna 206 into the interior of trailer 208, and to read the cargo identifier 214 that antenna 206 would not otherwise normally be able to read, given that the signals from antenna 206 and electronic cargo identifier 214 do not typically penetrate the trailer walls. Alternatively, antenna relays, ultra-high frequency signals, or any other mechanism that allows cargo identifier 214 to be read by mobile terminal unit 204, even through the walls of trailer 208, can be used with the present invention.

Figure 3A:
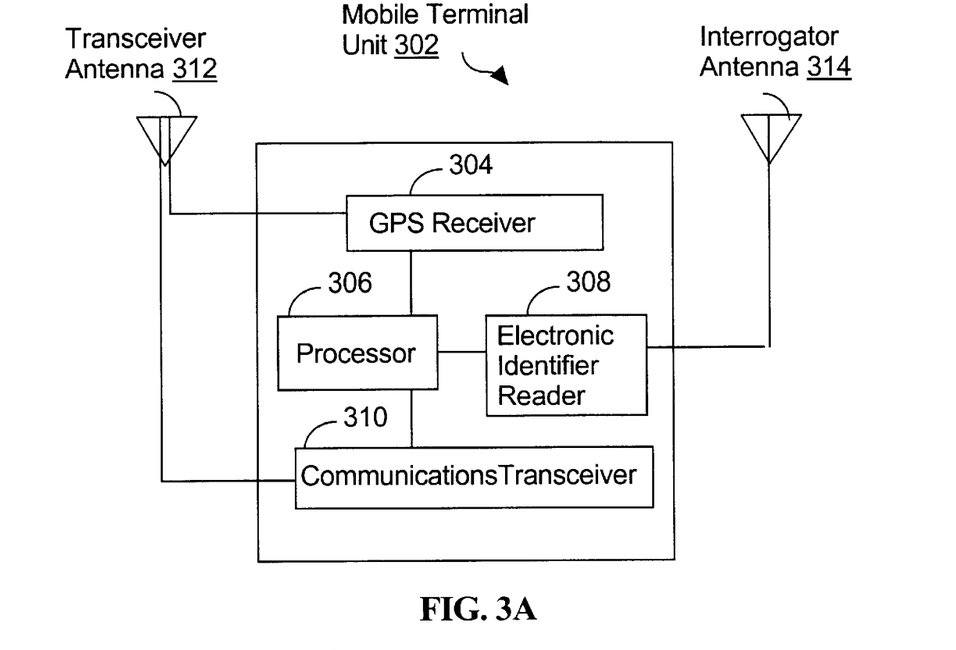
FIG. 3A is block diagram displaying some of the components of the mobile terminal unit of FIG. 2.

Referring to FIG. 3A, an example of a mobile terminal unit 302 is shown in accordance with one embodiment of the present invention. The mobile terminal unit 302 contains a GPS receiver 304, also referred to as a navigation system. GPS receiver 304 may be any type of conventional Global Positioning System that uses satellites to determine geographical coordinates and/or altitude, as is well-established and well-known by those of skill in the art. Alternatively, other types of position locating systems can be used with the present invention, such as Loran-C and other earth-based triangulation systems, including cellular-based systems. The invention is not meant to be limited to any particular type of position-location system, and indeed it is contemplated that future types of position location systems would be within the scope of the invention. GPS receiver 304 operates through transceiver antenna 312, shared by the communications transceiver 310, but in other embodiments may also have an independent antenna used solely by the GPS receiver, such as a helix antenna.

Mobile terminal unit 302 also includes electronic identifier reader 308, which operates through interrogator antenna 314. (The electronic identifier reader alone, or in combination with the interrogator antenna, is also referred to herein as an interrogator). In one embodiment, the electronic identifier reader and interrogator antenna comprise a RFID transceiver. As will be explained in further detail below, because the trailer's electronic identifier unit is constrained to a short transmission range for tractor-trailer communications, the interrogator antenna must be mounted as close to the rear of tractor as possible. Thus, the interrogator antenna 314 can be packaged separately for installation on the tractor near to the trailer. However, in general, GPS receiver 304, processor 306 (e.g., a programmed microcontroller or microprocessor), electronic identifier reader 308, communications transceiver 310, transceiver antenna 312, and interrogator antenna 314 are packaged together to minimize the number of separate packages that will have to be installed on the tractor, and thus the integrated mobile terminal unit 302 is preferably mounted close to the rear of the tractor.

The frequency (i.e., oftenness) of interrogation by the electronic identifier reader 308 is a function of the type of trailer attached to the tractor, as explained in more detail below. In one embodiment, the electronic identifier reader 308 is enabled to send interrogation signals only when the tractor (to which the electronic identifier reader 308 is mounted) is coupled to a trailer. Detecting the coupling of the tractor to a trailer is accomplished in this embodiment by using a simple open/closed circuit detector (not shown in the Figures) to detect when a power and signal cable from the tractor is coupled to a trailer (for providing power and control signals to the tail lights and signal lights on the trailer). In another embodiment, the tractor to trailer coupling detection mechanism is a short-range motion detector, mounted on the tractor at trailer height, to monitor the space immediately behind the tractor. In these embodiments, the electronic identifier reader 308 only sends interrogation signals when a detection mechanism detects that a trailer is coupled to the tractor. In yet another embodiment, the electronic identifier reader 308 periodically sends interrogation signals without regard to whether a trailer is coupled to the tractor.

Both electronic identifier reader 308 and GPS receiver 304 provide data input to processor 306. The data input may be raw data requiring further processing by processor 306, or it may be the actual geographical coordinates of the tractor (from the GPS receiver) and an electronic identifier of a coupled trailer (from the electronic identifier reader). As will be discussed in further detail below, the electronic identifier unit of a trailer may also provide additional status information, such as the temperature of a refrigerated trailer, to the electronic identifier reader 308. Again, this data may be an actual value, or it may be raw data that requires further algorithmic processing. Processor 306 conducts the necessary signal and data processing, and then prepares a data message, including the electronic identifier of a trailer (if any) coupled to the tractor, and the position of the tractor (and, by association, the position of the trailer), to be communicated back to the remote system 100. The mobile terminal unit 302 has an unique tractor identifier associated with it, which is included in the data message to identify the originating tractor of the message.

The data message is then handed off to communications transceiver 310, which may include a digital to analog converter to prepare the data for transmission, and which transmits the information via the transceiver antenna 312. Processor 306, communications transceiver 310, and transceiver antenna 312 jointly, or any of these components separately, is also referred to herein as a position-reporting subsystem (or, alternatively, a communication device). Thus, it is the position-reporting subsystem that reports the current position of the tractor, and the electronic identifier of the trailer that is coupled to the tractor, to the remote system. And, to obtain this information, the position-reporting subsystem is coupled to the GPS receiver 304 and to the electronic identifier reader 308, as described above. (As used herein, this type of "coupling" does not have to be a direct connection—it can also be made through one or more intermediary devices).

The position-reporting subsystem of a tractor may communicate with the remote system 100 (FIG. 1) on an event-driven basis, or on a periodic basis, or both. The types of events that may prompt the position-reporting subsystem of a tractor to report to the remote system include both scheduled events (e.g., coupling to a tractor or registering at a trailer yard), and unscheduled events (e.g., a trailer door opening). If the position-reporting subsystem reports on a periodic basis, it may call in to the remote system once a day, for example, to report the position of the tractor and the trailer (if any) coupled to the tractor. Additionally, the remote system can contact the mobile terminal unit through the position-reporting subsystem and request an update from the electronic identifier reader 308 and GPS receiver 304 at any time. In one embodiment, the mobile terminal unit will respond to the requested polling if the request was from a system having an approved calling identifier (e.g., the remote system), stored in the mobile terminal unit. Additionally, in one embodiment, the mobile terminal unit includes manual means for the driver to contact the remote system, such as a panic button, which causes the mobile terminal unit to transmit a distress message with emergency information, such as the tractor's location.

The mobile terminal unit 302 operates from a tractor's batteries. In one embodiment, the mobile terminal unit is designed to operate from these batteries without the engine running for up to 30 days.

Figure 3B:
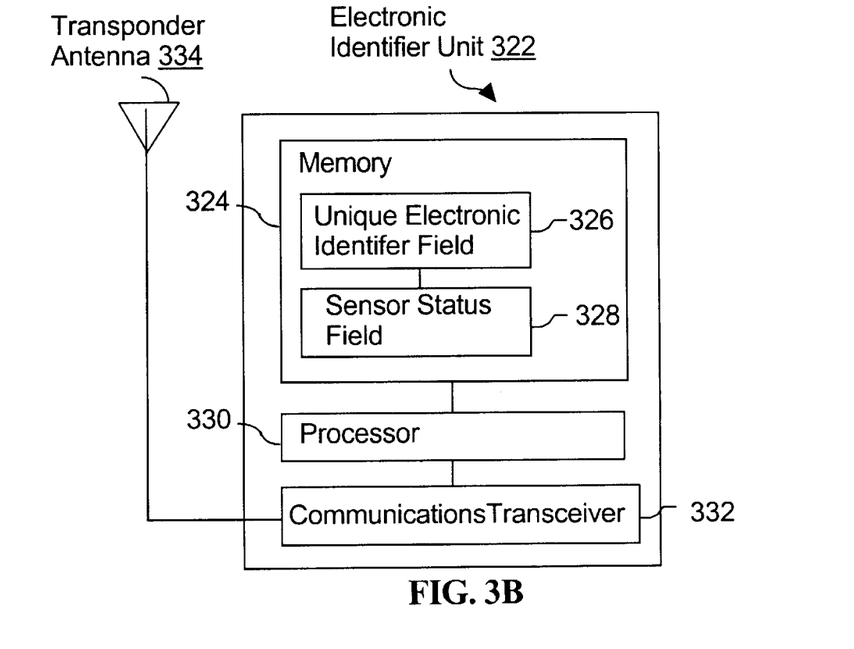
FIG. 3B is a block diagram displaying some of the components of the electronic identifier unit of FIG. 2.

Referring to FIG. 3B, an electronic identifier unit 322, also referred to herein as an unique electronic identifier, or tag, is shown, in accordance with one embodiment of the present invention. (In one embodiment, the electronic identifier unit 322 is a RFID transponder, and, in particular, an active transponder powered by a battery (not shown)). The electronic identifier unit is mounted on a trailer, and contains memory 324, including a unique electronic identifier field 326 and a sensor status field 328. In other embodiments, memory 324 may contain additional fields, or may include just a single field, such as the unique electronic identifier field 326 only, for example. Memory 324 may be a read-only, write one-read many, or a read-write memory. The electronic identifier 322 unit additionally includes a processor 330 and a communications transceiver 332. The communications transceiver 332 communicates through transponder antenna 334.

As is well-known in the art, RFID transponders send out a signal in response to an "interrogation" signal from a RFID interrogator. When an RFID tag is within range to receive the interrogation signal from the RFID interrogator, the processor of the RFID tag directs the tag to send out an appropriate response transmission containing the data stored in the memory 324 of the tag.

The electronic identifier unit 322 transmits the electronic identifier of a trailer to at least two different types of interrogators (i.e., electronic identifier readers). These include the interrogator of a tractor (whether a normal highway tractor or a "yard" tractor, which will be described below), and the interrogator of a trailer yard. However, the transmission distances required for each are different. With a tractor, a low-power, short-distance transmission is desirable because the interrogator of a tractor will be frequently interrogating the electronic identifier unit of a trailer—for example, as often as every fifteen minutes for a refrigerated trailer. Because the electronic identifier unit 322 operates from an internal battery source in one embodiment, the battery power will quickly be depleted with frequent interrogation unless the signal output by the electronic identifier unit is low. Thus, in one embodiment, the maximum distance between the mobile terminal unit 302 of a tractor and the electronic identifier unit 322 is two feet, necessitating that the electronic identifier unit 322 be mounted near the very front of a trailer, whether on top or on the front wall of the trailer.

The other type of interrogator that an electronic identifier unit 322 typically transmits to is one located at the gate of a trailer yard. Because the distance between a gate and an entering or departing tractor-trailer will generally be substantially greater than two feet, a higher-power transmission signal is necessary. In one embodiment, the electronic identifier unit 322 has a high-power transmission mode that can transmit a return transmission signal to about 200 feet.

The electronic identifier unit can output this kind of power because it does so very infrequently—only when a trailer is entering or leaving a trailer yard To determine the appropriate return transmission power level for transmitting a response to a query from an interrogator, the processor 330 of the electronic identifier unit analyzes the query. In one embodiment, a query will contain a data bit indicating whether the return transmission level should be high (i.e., up to 200 feet) or low (i.e., up to two feet), depending on whether the query was sent out by an electronic identifier reader from a trailer yard or a tractor, respectively. In other embodiments, the query may specify additional return transmission levels, such as a medium-range transmission level. This may be useful if electronic identifier readers are mounted at locations such as weigh stations or rest stops, or other types of stopping points where a trailer can be expected to pass reasonably close.

Alternatively, electronic identifier units can monitor for queries provided at different frequencies from different interrogators. Under this scheme, an electronic identifier unit will respond to a query identified at a particular frequency with a return transmission at a pre-specified power level corresponding to that frequency. Also, while a single electronic identifier unit 322 has been described with the capacity to transmit return signals at different power levels, separate electronic identifier units having different transmission capabilities can also be utilized for the different types of interrogators.

The unique electronic identifier field 326 of memory 324 contains an electronic identifier that uniquely identifies a particular trailer. This unique electronic identifier can be set by the manufacturer of the electronic identifier unit 322 if it is stored in read-only memory, or it can be written and rewritten by any party if it is stored in, for example, a flash memory. Using read-write memory provides greater flexibility for trailer identification systems that change dynamically—for example, for trailers that are leased out to multiple carriers. Also, using this type of memory allows the type of cargo, volume of cargo, condition of cargo, etc., carried by a trailer on a particular trip to be dynamically written into the unique electronic identifier field 326 or other fields in memory 324. Additionally, part of the unique electronic identifier field 326 may identify the type of trailer, whether a normal-cargo trailer, a refrigerated trailer, a livestock-cargo trailer, etc.

To dynamically write these values into the unique electronic identifier field 326, a fleet owner may use memory update stations at the loading dock of a trailer yard, for example, to record the type of cargo being loaded into a trailer. Also, in one embodiment, the mobile terminal unit 302 of a tractor may transmit a write command along with, or immediately after, a query, specifying that the unique electronic identifier field 326 and/or other fields in memory 324 be overwritten with an updated value. In this manner, trailer identifiers can be dynamically updated through commands issued by the remote system to the mobile terminal units, which may be useful to update the identifiers of single or multiple trailers to reflect new delivery routes, new leasees, new cargo, new dates, etc.

The optional sensor status field 328 contains information provided to the electronic identifier unit 322 by sensors that are mounted on the trailer body (not shown). The types of sensors that can be utilized include sensors to determine, for example: (i) whether the trailer doors are locked; (ii) whether the trailer doors are open; (iii) whether cargo is present; (iv) what type of cargo is present; (v) the weight of the cargo; (vi) the battery power remaining for the trailer; and (vii) if the trailer is refrigerated, the current temperature of the trailer. Of course, these are merely examples, and any other type of sensor that can be used to provide trailer-status information is envisioned to be within the scope of the invention.

For each of these categories of sensors, multiple sensors can be used to detect the status at different positions—for example, it may be useful to have sensors indicating the temperature of a refrigerator trailer in various positions throughout the trailer. In one embodiment, these sensors are hard-wired directly to the electronic identifier unit 322, but in other embodiments, some or all of the sensors are wireless, and transmit to a wireless receiver that is associated with the electronic identifier reader 322. If a trailer-tracking system does utilize sensor-status information, the portion of memory 324 containing the sensor status field 328 must be read-write, so that the dynamically changing status information detected by the sensors can be dynamically updated in the memory. The updating of status information can either be set up to occur as changes happen, i.e., as an event-driven system, or the processor 330 can periodically poll the sensors.

Refrigerated trailers generally include a temperature sensor, which is typically part of a thermostat connected to refrigeration equipment used control internal trailer temperature. Such trailers also often include door sensors that can be coupled to a light or other instrument that generates a warning when the trailer door or doors are left open. These sensors help prevent spoilage of cargo, in part by controlling the trailer temperature and in part by generating a warning when the trailer doors are open and when the temperature in the trailer exceeds a threshold level. In one embodiment, the electronic identifier units 322 mounted to refrigerated trailers store sensor-status information for at least one trailer thermostat and the open/closed status of the trailer doors, which may be a "temperature bit"(indicating whether the temperature in the trailer is above a threshold level) and a "door lock bit" (indicating whether the trailer doors are closed).

Additionally, a refrigerated trailer will preferably be interrogated by the mobile terminal unit 302 much more frequently than a non-refrigerated trailer, to ensure that internal temperature is within the appropriate range. Where a continuously-coupled, non-refrigerated trailer might be interrogated once or twice a day, a refrigerated trailer may be interrogated as often as every fifteen minutes. As described above, this puts a substantial drain on a battery, and does not leave much power to drive the sensors. Therefore, in one embodiment, the sensors used on a refrigerated trailer will draw their power from the same power source that provides the refrigeration itself. Other types of trailers, such as livestock-cargo trailers, may also require more frequent interrogation. In general, there is a hierarchy of trailer types indicating the frequency with which each type of trailer must be interrogated, which is typically programmed into a tractor's mobile terminal unit.

Even with a refrigerated trailer, however, the power for the electronic identifier unit 322 will typically still be provided from the same source as with other types of trailers—an internal battery, in one embodiment. As explained above, the close proximity requirements of the mobile terminal unit of a tractor, and the electronic identifier unit of a trailer, keep power requirements on the battery low. In addition, in one embodiment, the electronic identifier unit also uses well-known power-management techniques to reduce power drain to a very low level. Also, when a trailer couples to a tractor, the electronic identifier unit 322 of the trailer can recharge its batteries from the battery of the tractor. In one embodiment, the electronic identifier unit 322 is designed to operate on the internal batteries without charging for 90 days, and without replacement for a minimum of five years. Further, in another embodiment, solar cells supplement the recharging of the internal batteries.

While the electronic identifier unit 322 has been described as an active RFID transponder that operates from an internal battery, in another embodiment, it could also be a passive RFID transponder. As described above, a passive transponder uses power generated by induction from the query itself to transmit a response to the query. While this can be easily utilized for the tractor-trailer coupling, it does not provide the kind of return transmission distances potentially required at, for example, fixed-location facilities. However, passive electronic identifier units 322 may still be able to sufficiently transmit a response to a query if the interrogator is close enough, or if the energy level (and hence the inductive field) of the interrogator is high enough. This may be possible by, for example, routing all tractor-trailers entering or departing a trailer yard close enough to the station gate to allow the interrogator at the gate to successfully read the identifying data from the trailer.

Regardless of whether a trailer has sensors to provide status information or not, in one embodiment the electronic identifier unit 322 only provides status information if the interrogator requests it in the query. That is, the query will have one or more bits of data that specify whether the electronic identifier unit 322 should transmit the sensor status information, regardless of whether or not it is available. In another embodiment, the electronic identifier unit 322 does not respond to the query from an interrogator at all unless it unless the query contains data bits that identify the electronic identifier unit (perhaps by class of unit). This scheme may be used as a method to avoid cross-talk among electronic identifier units of trailers in close proximity.

Figure 4:
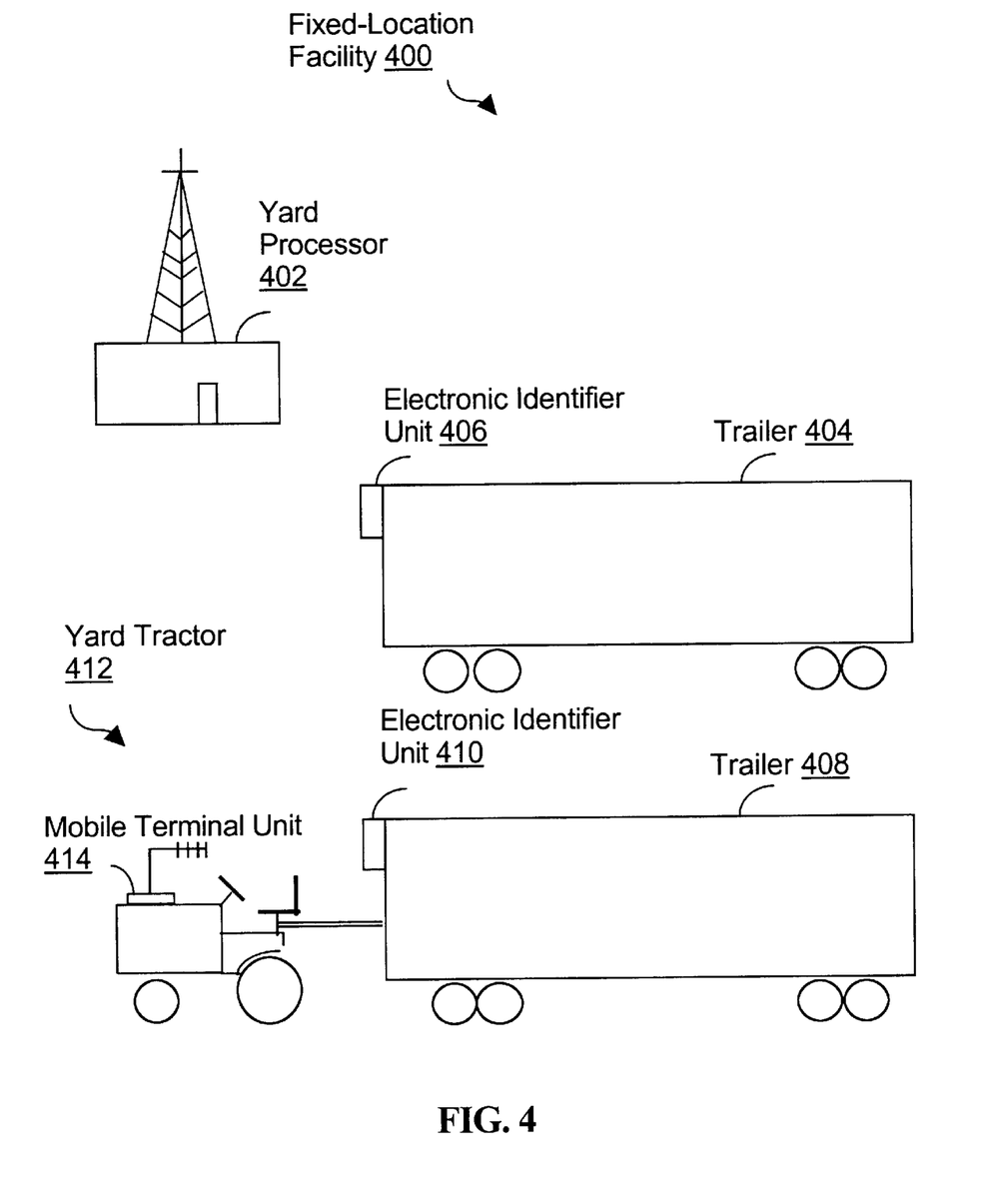
FIG. 4 is a schematic of a fixed-location facility, or trailer yard, including a yard processor, several trailers, and a yard tractor, based on an embodiment of the present invention.

Referring to FIG. 4, a fixed-location facility 400, or trailer yard, is shown. The fixed-location facility includes a yard processor 402, also referred to as a yard station, which comprises one or more electronic identifier readers, and a trailer-presence reporting subsystem coupled to the electronic identifier reader (not shown individually). The yard processor 402 would typically be located at, or nearby, the entry/exit gate of the fixed-location facility 400. The electronic identifier reader of the yard processor functions just like the electronic identifier reader on a tractor. In one embodiment the query issued by the yard processor specifies a higher return transmission power level, as described previously. In another embodiment, the RFID has only one transmission power level, suitable for transmission to interrogators up to a fixed distance (e.g., within a range of 8 to 20 feet).

In some embodiments, the electronic identifier reader may issue the query whenever a motion detector detects motion nearby the yard processor 402. Optionally, the motion may be set at a height associated with tractors to reduce queries issued when smaller vehicles pass by the yard processor. In other embodiments the yard processor may issue the query whenever a vehicle passes over a sensor in or under or on the ground of roadway near the yard entrance (also called the yard arrival point or gate or the ingress point or gate) or yard exit (also called the yard departure point or gate or the egress point or gate).

When the electronic identifier reader of a yard processor 402 located at the yard entrance reads an electronic identifier of a trailer, the trailer-presence reporting subsystem (also referred to as a communication device) reports to the centralized office, or remote system, that it has detected the trailer as present at the facility. Furthermore, to distinguish among multiple fixed-location facilities in a network of fixed-location facilities, each yard processor 402 has a yard identifier value that it uses to identify itself as part of the communication. Using the identifiers of the trailer and of the fixed-location facility, the remote system records the presence of the trailer in the yard. The communication is generally made over a wired WAN (wide area network), such as the Internet or other public-type network in one embodiment. In another embodiment the WAN is private, operated by the tractor-trailer fleet owner or by the provider of the trailer-tracking functionality described herein. In yet another embodiment, the yard processor transmits trailer information to the remote system using a wired or wireless telephone network.

When trailers 404 and 408 are dropped off at fixed-location facility 400, they pass by yard processor 402, close enough for the interrogator of the yard processor to read the electronic identifier units 406 and 410 of the trailers, respectively. The yard processor 402 may also be able to continuously detect the electronic identifiers 406 and 410 of trailers 404 and 408 stored at the facility, depending on their proximity to the yard processor. However, keeping trailers in range of the interrogator at the yard processor 402 is unnecessary to determine whether a trailer is present or not present in the facility.

Next, we address the issue as to how the system determines whether a trailer is registering or deregistering in the yard when it is detected by a yard processor 402 at an entrance or exit of the yard. Clearly, if the yard has separate entrances and exits that are sufficiently far apart that the yard processors 402 at each entrance is unable to detect trailers at any exit, and vice versa, then the potential for confusion is minimal or nonexistent. However, if either (A) an entrance and exit are shared or are very close to each other, or (B) the detection range of a yard processor 402 is sufficient to detect trailers at both an entrance and exit, then other mechanisms need to be used to ensure that the system can distinguish between trailers registering (i.e., entering) and trailers deregistering (i.e., leaving) a yard. The mechanism used in a preferred embodiment makes use of the historical information in the mobile trailer database 124 of the remote system 100 (FIG. 1).

For instance, when a trailer has been "on the road," and thus outside of a yard, there will typically be one or more records 600 (FIG. 6) in the database 124 have indicate which tractor the trailer is connected to and its position at various times in the recent past. When the trailer enters a yard, the yard processor at the yard entrance reports the detection of the trailer's ID to the remote system 100. The remote computer system 1000, by searching its database 124 for the most recent record(s) for the reported trailer ID determines from those records that the trailer has been "on the road" outside the yard and is therefore registering at the yard.

Next, when a trailer that has been registered in a yard is preparing to leave the yard, two events occur that inform the remote system 100 that the trailer is deregistering from the yard. First, when the trailer is hitched (i.e., coupled) to a tractor, in a preferred embodiment the tractor sends a communication to the remote system 100 reporting its location and identifying the trailer that has been hitched to the tractor. This information is entered in the database 124. However, the tractor trailer report at the time the two are hitched is optional (although helpful) and is not necessary for successful implementation of the present invention. When the trailer reaches the yard processor at the yard exit, the yard processor reports to the remote system 100 the presence of the trailer at the yard exit. Even if this yard exit is both an entrance and an exit, the computer system 100 determines that the trailer is deregistering from the yard by searching its database 124 for records associated with the trailer's trailer ID. From this search the computer system 100 determines (A) that the trailer was previously registered at the yard, and (B) that the trailer has not been reported to be "on the road" outside the yard since the time it registered with the yard. This information is sufficient for the computer system to determine that the trailer is deregistering from the yard.

In embodiments in which the hitching of the trailer to a tractor is contemporaneously reported (e.g., by the tractor's mobile terminal unit 204) to the remote system 100, the remote system 100 also finds a record 600 in its database 124 reporting that event. Finding this record provides further confirmation that the trailer at the yard exit is leaving and deregistering from the yard.

Thus, while having separate yard arrival and departure gates and yard processors simplifies the trailer registration and deregistration logic of the remote system, having a combined arrival and departure gate, with one or more yard processor at the gate, does not prevent the system from successfully determining which trailers are registering and which trailers are deregistering from a yard.

Figure 4A:
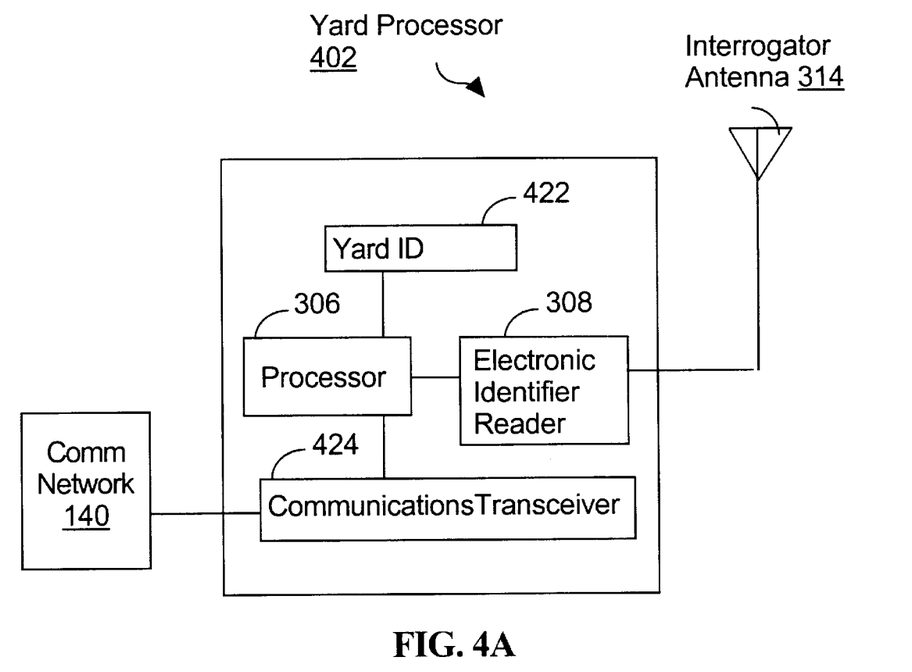
FIG. 4A is block diagram displaying some of the components of a yard processor of FIG. 4.

FIG. 4A is a block diagram of the yard processor 402. In one embodiment, portions of the yard processor 402 are similar to the mobile terminal unit 302 of FIG. 3A. In particular, the yard processor 402 includes a processor 306 (e.g., a programmed microcontroller or microprocessor), an electronic identifier reader 308, a communications transceiver 424, and a transceiver antenna 312. The yard processor's communications transceiver 424 is configured to exchange messages with the remote system via a communications network 140, such as a wide area network. Finally, the yard processor 402 preferably includes a yard ID 422, which identifies the yard in which the yard processor 402 is located, and preferably does not include a GPS receiver, since the location of the yard in which the yard processor 402 is located is a known, fixed location. Messages sent by the yard processor 402 to the remote system preferably include the yard ID 422 so as to identify the yard for which a report is being submitted to the remote system.

Also shown in FIG. 4 is yard tractor 412 having mobile terminal unit 414. Yard tractors are used to conduct yard operations, such as loading, unloading, and organizing of trailers in fixed-location facility 400. Yard tractors tend to be more utilitarian than highway tractors, and may be similar to the types of tractors used for agricultural purposes.

Figure 4B:
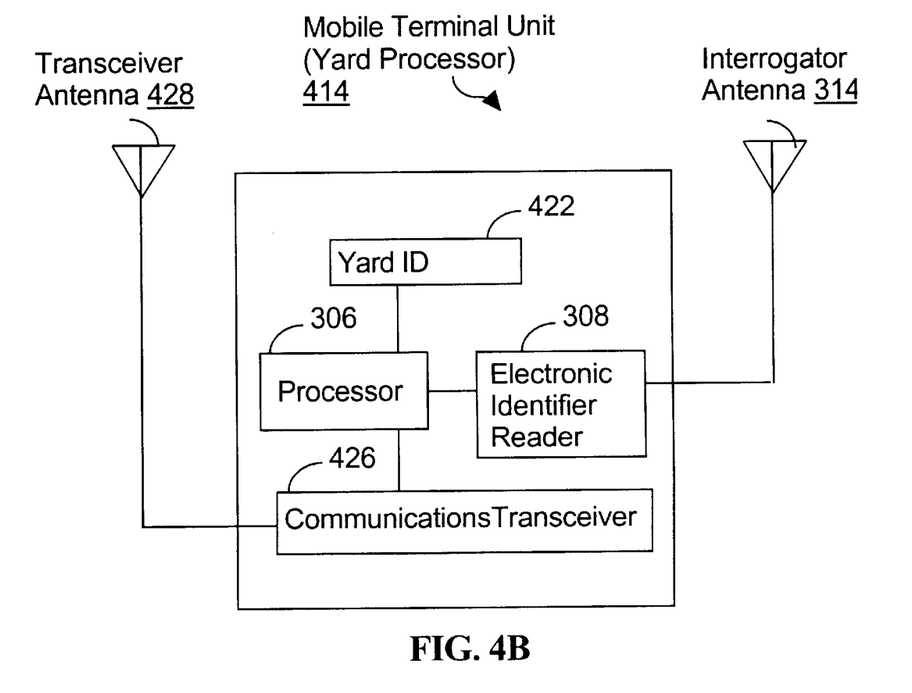
FIG. 4B is a block diagram displaying some of the components of a mobile terminal unit of FIG. 4.

Referring to FIG. 4B, the yard tractor's mobile terminal unit 414 is similar to a highway tractor's mobile terminal unit, but it does not have a GPS receiver in accordance with one embodiment of the present invention. This is because the trailer is known to be in the yard—its precise geographical coordinates are unnecessary. Instead, the mobile terminal unit 414 has a yard ID 422. However, in other embodiments, actual coordinates could be important for trailer organizational purposes, and the mobile terminal units of the yard tractors contain navigation (e.g., GPS) systems. Alternatively, if a fixed-location facility has enough interrogators placed at strategic places around the yard, it is possible to determine a trailer's position through well-known triangulation techniques.

The mobile terminal unit 414 of yard tractor 412 includes a processor 306 (e.g., a programmed microcontroller or microprocessor), an electronic identifier reader 308 for acquiring the electronic identifiers of trailers coupled to the mobile terminal unit 414, and a communications transceiver for reporting the attachment of a trailer to the yard tractor 412 for yard operations. In one embodiment, the mobile terminal unit 414 uses an antenna 428 to communicate directly with the remote system, for instance using a satellite or cellular link). In another embodiment, the yard processor 402 or another system local to the yard manages information about trailers and yard tractors within the yard, and in this embodiment the mobile terminal unit 414 uses antenna 428 to communicate with the yard processor 402 or other local system so as to provide the processor or system with information about the yard tractors and trailers in the yard.

At the remote system 100, or central office, shown in FIG. 1, a database 124 of mobile trailers stores dynamic real-time data for each trailer. For example, the database may indicate, for each trailer of a subset of a fleet of trailers: a current position of the trailer, the presence of the trailer in a fixed-location facility, any tractor that the trailer is coupled to, and/or a current position of the coupled tractor. (As used herein, a "subset" of something can be either a part of the thing, or the whole thing). To compile this information, the position-receiving subsystem receives signals (e.g., data messages) from the position-reporting subsystems of the tractors. Similarly, the trailer-presence receiving subsystem receives signals from the trailer-presence reporting subsystems (e.g., the yard processors) of the fixed-location facilities. Then, the tractor-trailer position processor processes these received signals to determine the current position of the transmitting tractors, the electronic identifiers of the trailers coupled to the tractors, and the presence of the trailers located within the fixed-location facilities. Other optional information that can be transmitted and processed includes status information from sensors on the trailers.

Another description of the functionality of the remote system 100 is that, at the remote system, a communication module receives tractor and yard information. The tractor information includes information identifying a current position of a tractor and an electronic identifier of a trailer coupled to the identified tractor, received from a communication device on the tractor. The yard information includes an electronic identifier of a trailer located within a fixed-location facility, received from a communication device at the fixed-location yard. A database 124 stores information concerning a location of each tractor and trailer of the fleet of mobile tractors and trailers, at the remote system.

Figure 5:
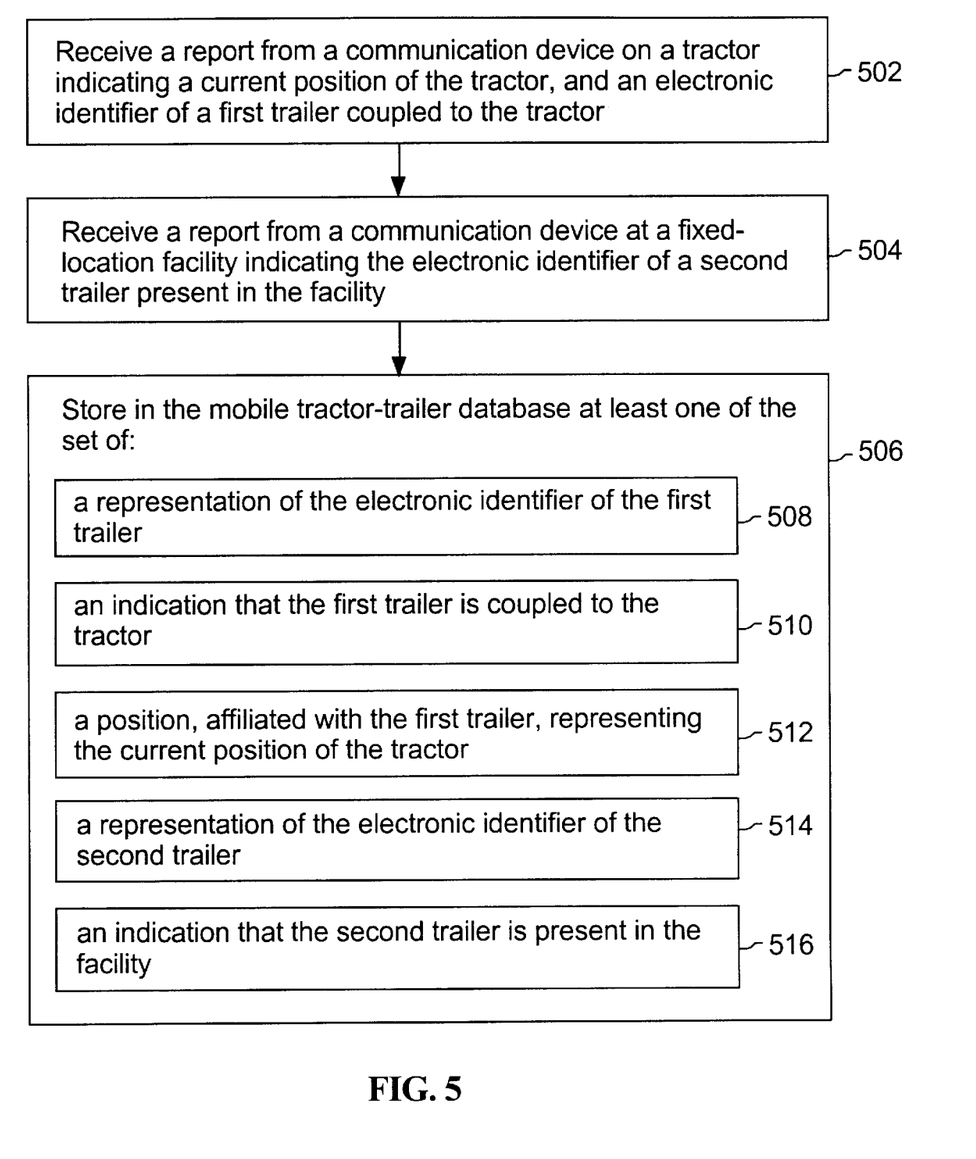
FIG. 5 is a flowchart demonstrating the maintenance of a mobile trailer database, in accordance with one embodiment of the present invention.

An example of a method of maintaining a database 124 of mobile trailers (also referred to as a mobile tractor-trailer database) is shown at FIG. 5, in accordance with one embodiment of the present invention. The remote system receives a report from a communication device on a first tractor indicating a current position of the first tractor, and an electronic identifier of a first trailer coupled to the first tractor (502). The remote system also receives a report from a communication device at a fixed-location facility indicating the electronic identifier of a second trailer present in the facility (504). Then, the remote system stores, in the mobile tractor-trailer database, at least one of the following (506): a representation of the electronic identifier of the first trailer (508); an indication that the first trailer is coupled to the first tractor (510); a position, affiliated with the first trailer, representing a current position of the first tractor (512); a representation of the electronic identifier of the second trailer (514); and/or an indication that the second trailer is present in the facility (516). The particular information stored, and the associations between the stored database records, are a function of the way the database is organized.

Figure 6:
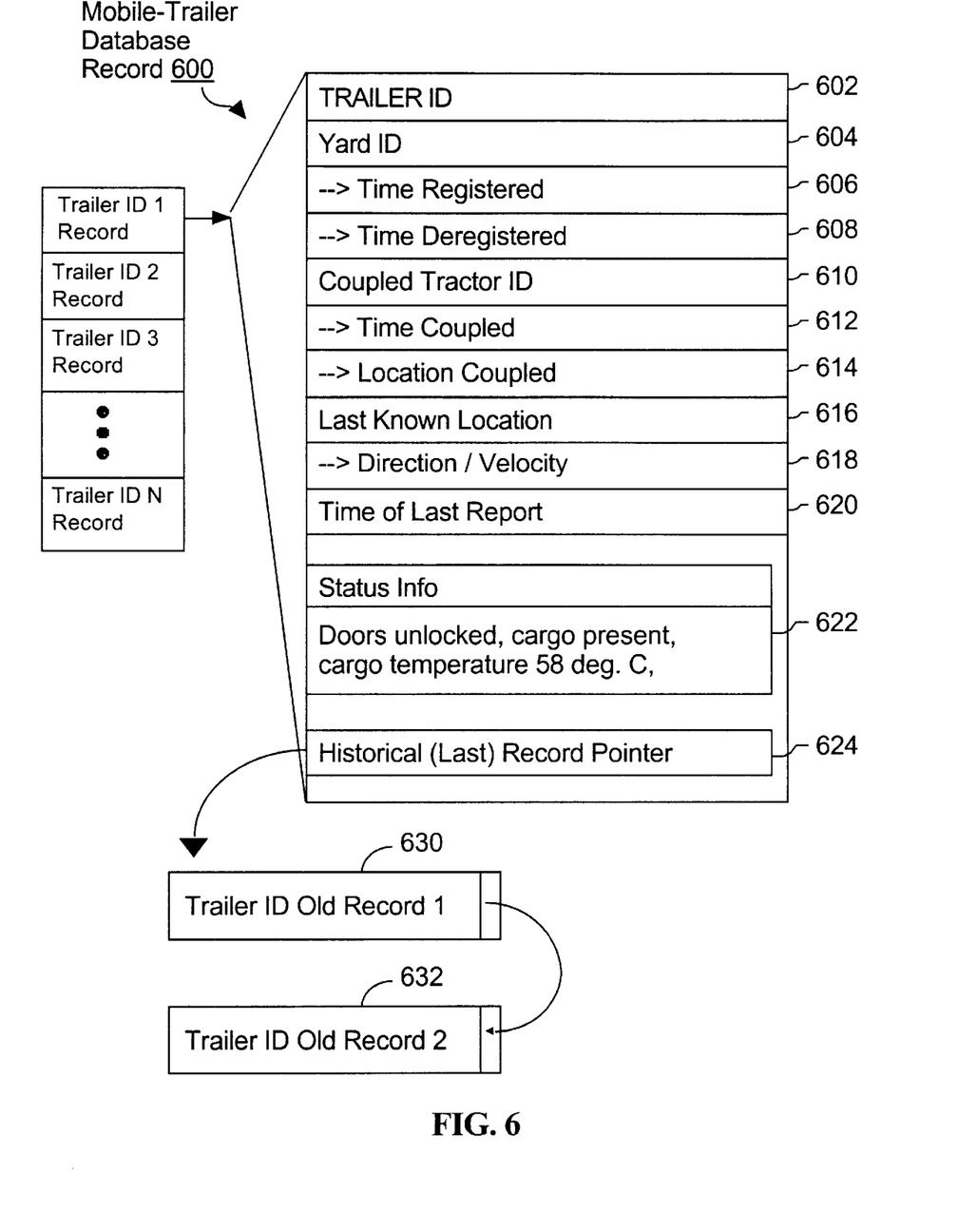
FIG. 6 shows an exemplary embodiment of a trailer record in a mobile-trailer database.

Records from an exemplary mobile-trailer database are shown in FIG. 6. As shown on the left side of FIG. 6, a series of "Trailer ID 1 . . . N" records are stored in a database. On the right is an exemplary mobile-trailer database record 600. As shown, the record is stored (sorted) under the trailer ID 602, which is either the direct unique electronic identifier of each trailer described earlier, or is at least derived from that value. While the database need not be organized strictly as a mobile trailer database, and may contain separate records for both tractors and trailers, this is strictly a matter of form as both types of databases would contain the exact same information (i.e., in a mobile trailer database, information about each tractor can be found in the record for the trailer to which that tractor is coupled).

The exemplary record 600 also contains a yard ID 604. Each yard (i.e., fixed-location facility) also must have an identifier, so that the database can distinguish at which yard a particular trailer is located. This identifier is typically associated with the yard processor at a particular yard. The yard ID 604 may be the actual numeric (or alphanumeric) value associated with each yard, or it may be converted to a geographic description of the particular yard (e.g., "Dayton, Ohio trailer yard"). Sub-entries organized under the yard ID are the time the particular trailer registered at the yard (606) and, if the trailer has left, the time that the trailer deregistered (608), as provided by the yard processor.

Further, record 600 includes a coupled tractor ID 610. This entry indicates which tractor a trailer is currently coupled to, if it is not stored in a yard. Optionally, sub-entries indicate the time the trailer was coupled to the tractor (612), and the location of the trailer at the time it coupled to the tractor (614). The coupled location information for the coupled tractor can be presented in geographical coordinates from the GPS system of the tractor, or it can be converted to an approximate geographical area, such as a city or even a particular trailer yard. Because, in an event-driven reporting system, a tractor's position-reporting subsystem will report to the remote system when it first detects the unique electronic identifier of a trailer, both the time (612) and location (614) of coupling should be relatively accurate (of course, this would not be true in a periodic-reporting-only system). In an alternative embodiment, record 600 may also contains a time of decoupling (not shown), if available. This would be the time that the tractor reports to the remote system, through its position-reporting subsystem, that the tractor's electronic identifier reader is no longer acquiring the electronic identifier of the trailer.

Next, record 600 contains the last known location of the trailer (616). This value is typically provided by one of two sources: either the coupled tractor's navigation (GPS) system, or a yard processor at the trailer yard where the trailer is currently registered, if this is the case. Depending on the frequency of reporting by the position-reporting subsystems of the tractors, or by the trailer-presence reporting subsystems of the trailer yards, the last known location could be very recent (i.e., in the case of a recent coupling, prompting an event-driven report from the coupled tractor), or it could be up to a day or more old (i.e., in the case of a periodic report by a tractor or in the case of a trailer left in a yard for more than a day).

As a sub-entry, the record may also optionally contain a direction of heading and velocity for the trailer (618). This could be calculated, in one embodiment, by comparing the last available location (available from other historic records, as will be described below) with a current location, as well as the time elapsed between the two location determinations. If reports are provided relatively frequently, this entry can provide a general indication of where a particular trailer is heading, and how fast. In the case of longer periodic reporting, this entry may only indicate an average speed for an entire day of travel, and a very approximate direction of travel.

In order to determine how recent the information contained in mobile-trailer database record 600 is, the record preferably stores a representation of the time the last report on the trailer was provided (620). Thus, the remote system records the last time it received a communication from the position-reporting subsystem of a tractor or the trailer-presence reporting subsystem of a fixed-location facility, and may also record whether the report was made at the time of the actual event, or on a periodic basis, or in response to a polling. This helps establish the accuracy (i.e., the recency) of the information provided by the position-reporting and trailer-presence reporting subsystems. This entry also assists a viewer in determining, for example, the accuracy of the direction/velocity entry 618.

The status information entry 622 contains information from optional trailer sensors as described above. For example, this field may contain information on the status of the doors (e.g., closed and/or locked), the electronic identifier of any cargo present, the temperature of the cargo, etc. While shown as a single field, each type of status data can be a separate entry in the record. Certain types of trailers will require certain types of status information 622, such as cargo temperature and trailer door status for a refrigerated trailer. Because status information can change relatively rapidly, the time of last report entry 620 may be particularly useful in gauging how accurate the status data entry or entries are.

Finally, record 600 contains a historical record pointer 624 to the last (older) record for this particular trailer, shown in FIG. 6 as "Trailer ID Old Record 1" (630). The Trailer ID Old Record 1 itself points to the next oldest (next last) record—"Trailer ID Old Record 2" (632). The length of time before a current record becomes a historical record can range anywhere from each time any entry in the record changes, up to some pre-specified recording period, such as daily or weekly. Obviously, the more frequently that historical records are created, the more information that is stored for each trailer, and the larger the size of the database. In another embodiment, each entry in mobile-trailer database record 600 directly contains older, historical values for each entry, allowing a direct comparison of current to historical values. In a different embodiment, historical data is stored both in the current record (for some or all of the entries), and in linked historical records.

As an alternative to the linked-list of historical records, a subset of the information stored in the current mobile-trailer database record 600 can be kept as historical data in a log file. For example, for each trailer in a fleet of trailers, the log file may include information records indicating historical position information for the trailer, and a list of tractors to which the trailer has been coupled. The log file may also include information records indicating, for each tractor in a fleet of tractors, historical position information for the tractor, and a list of electronic identifiers of trailers historically coupled to the tractor. Also, the log file might include information records indicating, for each fixed-location facility in a network of fixed-location facilities, a list of one or more trailers historically reported as being present in the facility. These are just examples of different types of historical records and data that might be available; many other types of historical records, whether kept in linked-list format or as a log file, and whether organized by trailer, tractor, or fixed-location facility, are all envisioned to be within the scope of the invention.

By using linked records or the log file of the mobile-trailer database, a user could request a report detailing the complete history of a trailer. The historical report on a trailer could include such information as the trailer's lifetime whereabouts, different cargo loads, tractors to which it has been coupled, the trailer yards where it has been stored, the functioning of its sensors, etc. Correspondingly, a user could request similar reports for tractors and trailer yards, such as which trailers a particular tractor has been coupled to, and which trailers have been present in a particular yard, as this information is also available from the mobile-trailer database. Reports could be generated using various limiting parameters, such as particular dates, types of trailers, trailers that have hauled certain cargo types, etc. The ability to generate tailored reports from the mobile-trailer database is only limited by the type and amount of data available in the database.

Alternate Embodiments

While some embodiments of the present invention have been described as utilizing a Global Positioning System for navigation, and a RFID interrogator/tag system for trailer identification, any other systems that accomplish the same functions would be equally applicable to the present invention. Thus, for example, a system using cellular- or other type of radio-wave triangulation to determine tractor and trailer positioning would be within the scope of the invention. Similarly, the invention would encompass a system whereby a driver manually provides geographic information into a tractor's mobile terminal unit for transmission back to the remote station. In the context of the present invention, the navigation system only needs to be able to provide some kind of periodic geographical position reporting.

Similarly, the RFID interrogator and tag system described for some embodiments of the present invention could be replaced by other types of communicating devices that can provide an identification function. Thus, for example, infrared LED detectors and transmitters could be used for the querying and identifying functions of the interrogator and tag. Or, a long-range bar code scanning system could scan bar codes attached to trailers. The main requirement is that whatever aspect of any alternative system is associated with the trailer, it must have low power requirements, such that it can operate off of an internal battery. Otherwise, the system need only be able to read identifying features from a trailer, whether by query and response, or by periodic broadcast message, or by a scanning system, but it must be able to do so from multiple locations.

Some aspects of the present invention can also be implemented as a computer program product that includes a computer program mechanism embedded in a computer readable storage medium. For instance, the computer program product could contain the database of mobile trailers, and could contain functionality of the position-receiving subsystem, trailer-presence receiving subsystem, and tractor-trailer position processor shown in FIG. 1. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

We claim:

1. A position tracking system for a plurality of mobile tractors and trailers comprising:

an unique electronic identifier for each of a plurality of trailers;

for each tractor of a plurality of tractors:
   a navigation system for determining a current position of the tractor;
   an electronic identifier reader for acquiring the electronic identifier of a trailer, of the plurality of trailers, coupled to the tractor; and
   a position-reporting subsystem, coupled to the navigation system and to the electronic identifier reader, for reporting to a remote system the current position of the tractor and the electronic identifier of the trailer coupled to the tractor;

at each facility of a plurality of fixed-location facilities:
   one or more electronic identifier readers for acquiring the electronic identifier of one or more trailers, of the plurality of trailers, located within the facility;
   a trailer-presence reporting subsystem, coupled to the one or more electronic identifier readers of the facility, for reporting to the remote system the presence of the one or more trailers located within the facility.

2. The position tracking system of claim 1, wherein each trailer of a subset of the plurality of trailers contains a plurality of sensors, the plurality of sensors being in communication with the unique electronic identifier of each trailer, and wherein the unique electronic identifier of each trailer further contains status information obtained from a subset of the plurality of sensors.

3. The position tracking system of claim 2, wherein, for each tractor in the plurality of tractors, the electronic identifier reader is also used for acquiring the status information of a trailer, of the subset of the plurality of trailers, coupled to the tractor, and further wherein the position-reporting subsystem is also used for reporting to the remote system the status information of the trailer coupled to the tractor.

4. The position tracking system of claim 2, wherein the sensors include at least one sensor selected from the set of:
   door locks sensor;
   door open sensor;
   cargo present sensor;
   refrigerator temperature sensor;
   cargo type sensor;
   cargo weight sensor; and
   battery power sensor.

5. The position tracking system of claim 1, wherein the remote system is configured to receive reports from the position-reporting subsystems of the plurality of tractors, and from the trailer-presence reporting subsystems of the plurality of fixed location facilities, and further including a database for storing information, associated with the received reports, regarding the plurality of mobile tractors and trailers.

6. The position tracking system of claim 5, wherein the database further indicates when a trailer couples to a tractor based upon the time at which the tractor reports to the remote system, through its position-reporting subsystem, the electronic identifier of the trailer coupled to the tractor.

7. The position tracking system of claim 6, wherein the database further indicates a location of the trailer when it couples to the tractor, as reported to the remote system by the position-reporting subsystem of the coupled tractor.

8. The position tracking system of claim 5, wherein the database further indicates when a trailer leaves a facility, based upon the trailer being reported as present at the facility by the trailer-presence reporting subsystem of the facility, and based upon the trailer being recently coupled to a tractor, as reported by the tractor through its position-reporting subsystem.

9. The position tracking system of claim 5, wherein each facility of the plurality of fixed-location facilities has one or more egress areas, and further wherein a subset of the one or more electronic identifier readers at each facility are located proximate to a subset of the one or more egress areas.

10. The position tracking system of claim 9, wherein the database further indicates when a trailer leaves a facility based upon the trailer being recently coupled to a tractor, as reported by the tractor through its position-reporting subsystem, and based upon the trailer being reported as proximate to an egress area, as detected by the one or more electronic identifier readers and reported by the trailer-presence reporting subsystem of the facility.

11. The position tracking system of claim 5, wherein the database further indicates when a trailer arrives at a facility, based upon the trailer being coupled to a tractor as reported by the position-reporting subsystem of the tractor, and based upon the trailer being reported as present at the facility by the trailer-presence reporting subsystem of the facility.

12. The position tracking system of claim 5, wherein each facility of the plurality of fixed-location facilities has one or more ingress areas, and further wherein a subset of the one or more electronic identifier readers at each facility are located proximate to a subset of the one or more ingress areas.

13. The position tracking system of claim 12, wherein the database further indicates when a trailer arrives at a facility based upon the trailer being coupled to a tractor, as reported by the tractor through its position-reporting subsystem, and based upon the trailer being reported as proximate to an ingress area, as detected by the one or more electronic identifier readers and reported by the trailer-presence reporting subsystem of the facility.

14. The position tracking system of claim 12, wherein at least one of the ingress areas is an ingress/egress area, and further wherein the one or more electronic identifier readers proximate to the ingress/egress area comprise at least two electronic identifier readers, one of the at least two electronic identifier readers being utilized to acquire the electronic identifiers of trailers leaving the facility, and another of the at least two electronic readers being utilized to acquire the electronic identifiers of trailers arriving at the facility.

15. The position tracking system of claim 14, wherein the electronic identifier reader proximate to the ingress/egress area utilized to acquire the electronic identifiers of trailers leaving the facility is positioned to acquire electronic identifiers in a different direction than the electronic identifier reader proximate to the ingress/egress area utilized to acquire the electronic identifiers of trailers arriving at the facility.

16. The position tracking system of claim 5, wherein the database further indicates when a trailer decouples from a tractor based upon when the tractor reports to the remote system, through its position-reporting subsystem, that the tractor's electronic identifier reader is no longer acquiring the electronic identifier of the trailer.

17. The position tracking system of claim 1, further comprising:
at the remote system:
a position-receiving subsystem, coupled to the remote system, for receiving signals from the position-reporting subsystems of the plurality of tractors;
a trailer-presence receiving subsystem, coupled to the remote system, for receiving signals from the trailer-presence reporting subsystems of the plurality of fixed-location facilities;
a tractor-trailer position processor, coupled to the position-receiving subsystem and to the trailer-presence receiving subsystem, for processing the received signals from the position-reporting subsystems of the plurality of tractors to determine the current positions of the plurality of tractors, and to determine the electronic identifiers of the trailers coupled to the plurality of tractors, and wherein the tractor-trailer position processor is also for processing the received signals from the trailer-presence reporting subsystems of the plurality of fixed-location facilities to determine the presence of one or more trailers located within the plurality of fixed-location facilities; and
a database of mobile trailers indicating, for each trailer in a subset of the plurality of mobile trailers, at least one entry selected from the group consisting of:
a current position of the trailer;
the presence of the trailer in a facility;
a coupled tractor; and
a current position of the coupled tractor.

18. The position tracking system of claim 5, wherein the database of the remote system further includes a log file containing at least one record selected from the group consisting of:
A) a plurality of information records, indicating for each tractor of the plurality of tractors, historical position information for the tractor;
B) a plurality of information records, indicating for each tractor of the plurality of tractors, a list of the electronic identifiers of trailers historically coupled to the tractor;
C) a plurality of information records, indicating for each trailer of the plurality of trailers, historical position information for the trailer;
D) a plurality of information records, indicating for each trailer of the plurality of trailers, a list of tractors to which the trailer has historically been coupled; and
E) a plurality of information records, indicating for each facility of the plurality of fixed-location facilities, a list of one or more trailers historically reported as being present within the facility.

19. The position tracking system of claim 18, wherein the tractor-trailer position processor determines, using the historical position information for a tractor, at least one of a velocity and a direction of travel for the tractor.

20. The position tracking system of claim 1, further comprising, at each facility of the plurality of fixed-location facilities, one or more yard tractors, each yard tractor having an electronic identifier reader for acquiring the electronic identifier of a trailer, of the plurality of mobile trailers, attached to the yard tractor, each yard tractor further having a yard-operations reporting subsystem, coupled to its electronic identifier reader, for reporting to the trailer-presence reporting subsystem the attachment of the trailer to the yard tractor for yard operations.

21. The position tracking system of claim 1, wherein the electronic identifier readers of the plurality of tractors and of the plurality of fixed-location facilities include a transmitter for querying the unique electronic identifier of each trailer of the plurality of mobile trailers.

22. The position tracking system of claim 21, wherein the transmitter comprises a wireless transmitter, and wherein the query indicates a transmission level, and further wherein the unique electronic identifier of each trailer includes a wireless return transmitter for transmitting the electronic identifier of the trailer at the indicated transmission level when queried by the wireless transmitter.

23. The position tracking system of claim 22, wherein the transmission level of an electronic identifier reader of a facility is higher than the transmission level of an electronic reader of a tractor.

24. The position tracking system of claim 1, wherein each trailer of a subset of the plurality of trailers is capable of carrying cargo, and further wherein a trailer-load of cargo includes an electronic cargo identifier, and further wherein the electronic identifier reader of a subset of the plurality of tractors includes an extension into the interior of a coupled trailer, through a wired tractor-trailer connection, for acquiring the electronic cargo identifier of a trailer-load of cargo, and further wherein the position-reporting subsystem of the subset of tractors is also used for reporting the electronic cargo identifier of the trailer-load of cargo of a coupled trailer to the remote system.

25. The position tracking system of claim 1, wherein the unique electronic identifiers of the plurality of trailers comprise RFID transponders, and the electronic identifier readers of the plurality of tractors and of the plurality of fixed-location facilities comprise RFID transceivers.

26. A method of maintaining a mobile tractor-trailer database for use in a position tracking system for a plurality of mobile tractors, mobile trailers, and fixed-location yards, each trailer of the plurality of mobile trailers having an unique identifier, the unique identifier of each trailer being identifiable by a tractor to which the trailer is coupled, the unique identifier of each trailer also being identifiable by a fixed-location yard in which the trailer is located, each tractor of the plurality of tractors having a navigation system for determining a current position of the tractor, the method comprising:

receiving, at a remote system, a report from a communication device on a tractor indicating a current position of the tractor, and indicating an electronic identifier of a first trailer coupled to the tractor;

receiving, at the remote system, a report from a communication device at a fixed-location facility indicating the electronic identifier of a second trailer present in the facility; and storing in the mobile tractor-trailer database at least one entry selected from the group consisting of:
   a representation of the electronic identifier of the first trailer;
   an indication that the first trailer is coupled to the tractor;
   a position, affiliated with the first trailer, representing the current position of the tractor;
   a representation of the electronic identifier of the second trailer; and
   an indication that the second trailer is present in the facility.

27. The method of claim 26, further comprising storing in the mobile tractor-trailer database an indication of when the first trailer couples to the tractor, based upon the time at which the tractor reports to the remote system, through its communication device, the electronic identifier of the first trailer coupled to the tractor.

28. The position tracking system of claim 27, further comprising storing in the mobile tractor-trailer database a location of the first trailer when it couples to the tractor, as reported by the communication device of the tractor to the remote system.

29. The method of claim 26, further comprising storing in the mobile tractor-trailer database an indication of when the second trailer leaves the facility, based upon the second trailer being reported as present at the facility by the communication device of the facility, and based upon the second trailer being recently coupled to a second tractor, as reported by the second tractor through its communication device.

30. The method of claim 26, further comprising storing in the mobile tractor-trailer database an indication of when the second trailer arrives at the facility, based upon the second trailer being coupled to a second tractor, as reported by the second tractor through its communication device, and based upon the second trailer being reported as present at the facility by the communication device of the facility.

31. The method of claim 26, further comprising storing in the mobile tractor-trailer database an indication of when the first trailer decouples from the tractor based upon when the tractor reports to the remote system, through its communication device, that the tractor's electronic identifier reader no longer is acquiring the electronic identifier of the first trailer.

* * * * *